United States Patent
Manzi (10) Patent No.: US 8,864,039 B2
(45) Date of Patent: Oct. 21, 2014

(54) TRANSPONDER TAGGED OBJECT AND METHOD FOR MANUFACTURING A TRANSPONDER TAGGED OBJECT

(75) Inventor: Giuliano Manzi, Graz (AT)

(73) Assignee: NXP B.V., Eindhoven (NL)

( * ) Notice: Subject to any disclaimer, the term of this patent is extended or adjusted under 35 U.S.C. 154(b) by 199 days.

(21) Appl. No.: 13/306,315

(22) Filed: Nov. 29, 2011

(65) Prior Publication Data

US 2012/0132718 A1 May 31, 2012

(30) Foreign Application Priority Data

Nov. 30, 2010 (EP) .................................... 10193211

(51) Int. Cl.
*G06K 19/06* (2006.01)
*G06K 19/077* (2006.01)
*H01Q 1/22* (2006.01)

(52) U.S. Cl.
CPC ........ *G06K 19/07749* (2013.01); *H01Q 1/2225* (2013.01)
USPC ...................... 235/492; 340/572.7; 340/572.1

(58) Field of Classification Search
USPC .............................. 235/492; 340/572.7, 572.1
See application file for complete search history.

(56) References Cited

U.S. PATENT DOCUMENTS

| 7,158,033 | B2 | 1/2007 | Forster |
| 7,444,736 | B1 * | 11/2008 | Warning .......................... 29/600 |
| 7,619,531 | B2 | 11/2009 | Carrender et al. |
| 7,646,305 | B2 * | 1/2010 | Cote et al. ................... 340/572.7 |
| 7,741,972 | B2 | 6/2010 | Hashimoto et al. |
| 8,072,333 | B2 | 12/2011 | Ferguson et al. |
| 2006/0243811 | A1 | 11/2006 | Koyama et al. |
| 2006/0255945 | A1 * | 11/2006 | Egbert ........................ 340/572.7 |
| 2007/0194935 | A1 * | 8/2007 | Ayala et al. ................. 340/572.8 |
| 2008/0106412 | A1 * | 5/2008 | Sakama et al. .............. 340/572.1 |
| 2008/0283618 | A1 * | 11/2008 | Pueschner et al. ............. 235/492 |
| 2009/0014527 | A1 | 1/2009 | Grasset et al. |
| 2009/0207027 | A1 * | 8/2009 | Banerjee et al. ........... 340/572.7 |
| 2010/0065647 | A1 | 3/2010 | Ritamaki et al. |
| 2010/0219252 | A1 | 9/2010 | Kikuchi et al. |
| 2010/0253583 | A1 * | 10/2010 | Furutani ....................... 343/702 |

FOREIGN PATENT DOCUMENTS

| CN | 19993703 A | 7/2007 |
| CN | 101040289 A | 9/2007 |
| CN | 101178785 A | 5/2008 |
| DE | 101 08 080 C1 | 4/2002 |

* cited by examiner

*Primary Examiner* — Allyson Trail (57) ABSTRACT

It is described a transponder tagged object, comprising: a conductive structure (103, 105, 403, 405); an insulating region (109, 409) galvanically isolating a first portion (103, 403) of the conductive structure from a second portion (105, 405) of the conductive structure; and a transponder tag (111, 411, 611) comprising a first antenna pad (133, 333) and a second antenna pad (135, 335), wherein the transponder tag is fixed at the object such that the first portion of the conductive structure in particular capacitively couples to the first antenna pad and such that the second portion of the conductive structure in particular capacitively couples to the second antenna pad. Further, a method for manufacturing a transponder tagged object is described.

9 Claims, 6 Drawing Sheets

TRANSPONDER TAGGED OBJECT AND METHOD FOR MANUFACTURING A TRANSPONDER TAGGED OBJECT

CROSS-REFERENCE TO RELATED APPLICATIONS

This application claims the priority under 35 U.S.C. §119 of European patent application no. 10193211.9, filed on Nov. 30, 2010, the contents of which are incorporated by reference herein.

FIELD OF THE INVENTION

The present invention relates to a transponder tagged object and to a method for manufacturing a transponder tagged object. In particular, the present invention relates to a transponder tagged object and to a method of manufacturing a transponder tagged object, wherein a portion of the object is capacitively coupled to the transponder tag to allow the transponder tag to communicate with a reader. Further in particular, the present invention relates to a transponder tagged object and to a method for manufacturing a transponder tagged object, wherein the transponder tag operates with an electromagnetic gap antenna or with an electromagnetic band gap antenna.

BACKGROUND OF THE INVENTION

US 2007/0017986 A1 discloses a technique for a radio frequency identification (RFID) device, wherein the device includes a slot antenna having at least one slot disposed in a first substrate. A strap disposed across the slot includes a second substrate and an integrated circuit. The integrated circuit is electrically coupled to the slot antenna. For electrically coupling the integrated circuit to the slot antenna feed lines are provided.

US 2008/0018479 A1 discloses a metal suitable RFID tag and a RFID tag unit therefore, wherein the RFID tag comprises a chip, an antenna and an impedance adjustment part, which is formed on the surface of the substrate material part. The impedance adjustment part connects two portions of a dipole antenna. The dipole antenna is formed on both sides of the chip and the impedance adjustment part is a conductor which is equipped for adjusting an impedance characteristics of the antenna.

US 2010/0219252 A1 discloses a RFID tag substrate for metal component, wherein the RFID tag comprises a substrate layer, a functional layer formed of a high dielectric constant layer and a high permeable layer having different characteristics, wherein the functional layer having predetermined relative dielectric constant and relative permeability is provided, and a product of the relative dielectric constant and the relative permeability is not smaller than 250. The antenna is mounted on a functional layer and the chip is mounted onto the antenna.

US 2010/0065647 A1 discloses a radio frequency identification tag comprising a planar inverted F antenna, a loop antenna, or a dual patch antenna. The integrated circuit on a chip is electrically connected to the coupling plates forming the antenna.

In particular, it has been observed that it may be difficult to tag a metal object with a transponder, since the metal deteriorates radio frequency communication between the transponder and a reader. In the prior art special antennas have been proposed to receive or send a radio frequency signal at the transponder or from the transponder, respectively, in the case the tagged object is a metal object. Thereby, designing, constructing and manufacturing of these special antennas is difficult, cumbersome and cost-expensive.

There may be a need for a transponder tagged object and a method for manufacturing a transponder tagged object, wherein the object comprises a conducting material, such as a metal. Further, there may be a need for a transponder tagged object and a method for manufacturing a transponder tagged object, wherein the above-mentioned problems are at least partially overcome.

OBJECT AND SUMMARY OF THE INVENTION

According to an embodiment a transponder tagged object is provided, wherein the transponder tagged object comprises a conductive structure (electrically conducting an electric current, in particular a metal structure, a frame structure or a casing or housing structure or at least partially forming a housing or a casing of the object); an insulating region (comprising in particular a dielectric material, the insulating region possibly comprising an insulating air region or vacuum region, wherein the insulating region (by in particular a solid material comprised in the insulating region) galvanically isolates (such that no electric current is flowing from the first portion across the insulation region to the second portion, wherein it is not excluded that the first portion may be connected to the second portion at another region not comprising the insulation region, wherein in particular the first portion is not conductively connected or coupled to the second region) a first portion (such as a first frame portion or a first casing portion of the object) of the conductive structure from a second portion of the conductive structure (in particular the conductive structure is separated into the first portion and the second portion such that the first portion is electrically entirely disconnected from the second portion); and a transponder tag (in particular comprising an integrated circuit for generating and/or receiving a radio frequency signal for communication with a reader device) comprising a first antenna pad (which may act as a first antenna input pad and/or a first antenna output pad) and a second antenna pad (which may also act as a second antenna input pad and/or a second antenna output pad, the pads being formed of a electrically conductive material, such as a metal, for example aluminium or copper), wherein the transponder tag is fixed at the object (such as by gluing or by using bolts) such that the first portion of the conductive structure capacitively couples (such that the first portion having influence charges resulting from a radio frequency electromagnetic wave, wherein the influence electrical charges generate an electrical field which influences a distribution of charges at the first antenna pad during reception of a signal sent from a reader device or such that a signal applied at the first antenna pad by the transponder generates an electrical field which influences a distribution of charges at the first portion for transmission of a radio frequency signal being generated by the transponder) to the first antenna pad and such that the second portion of the conductive structure capacitively couples to the second antenna pad. In particular, during reception of a radio frequency signal sent by a reader device an electric field may be generated between the first portion of the conductive structure and the second portion of the conductive and an electric field may be generated between the first portion of the conductive structure and the first antenna pad thus leading to a changed distribution of charges within the first antenna pad and resulting to a radio frequency signal in the first antenna pad. Further, an electric field may be generated between the second portion of the conductive structure and the second antenna pad such that the second antenna pad receives the radio frequency signal according to a redistribution of charges within the second antenna pad and also according to the charge movement in the second antenna pad in accordance to the varying electric field in the second portion of the conductive structure.

A capacity between the first portion of the conductive structure and the first antenna pad may depend on a distance between the first portion of the conductive structure and the first antenna pad, a geometry of the first portion, a geometry of the first antenna pad and on a material in between the first portion of the conductive structure and the first antenna pad. Similarly, a capacity between the second portion of the conductive structure and the second antenna pad may also depend on a distance between these two elements, a material placed in between these two elements and on an orientation of these two elements relative to each other. Further, a capacity between the first portion of the conductive structure and the second portion of the conductive structure may also depend on a distance of the first portion and the second portion (in particular a width of the insulating region between the first portion and the second portion), a material of the insulating region or in general a material placed in between the first portion and the second portion, and on a geometry of the first portion and the second portion and also on other parameters. According to an embodiment at least one of the first portion and the second portion of the conductive structure acts as a dipole antenna.

According to an embodiment the transponder tag is configured as a strap comprising a substrate, a conductive material and an RFID integrated circuit, wherein the first portion of the conductive structure and the second portion of the conductive structure form an electromagnetic gap antenna or an electromagnetic band gap antenna. Thereby, the strap forming the transponder tag is electrically coupled to the antenna and/or to the scattering metal object and/or electromagnetic band gap antenna and receives thereby RF signals from a reader device, such as an interrogator. Thereby, in particular the energy needed to activate the digital circuit comprised within the transponder tag and needed to answer the interrogator with an ID code may be provided by the reader device such that no particular electrical energy storage is required for the transponder tag.

In particular, embodiments of the present invention may be used for tagging a metal object, which is extremely complex using a conventional method due to the high interaction between the electromagnetic field and the metal comprised in the object. By providing the transponder tagged object according to an embodiment no special antenna configuration is required any more which had to be combined in the prior art with the use of special material to mitigate the negative impact of the metal structure to the RFID tag antenna attached on.

In particular, the transponder tag may be configured as a strap consisting of a substrate, a conductive material and an RFID integrated circuit, wherein the strap is electrically coupled to an electromagnetic gap antenna or more general a scattering metallic structure or/and an electromagnetic band gap antenna which may be formed by the first portion of the conductive structure, the second portion of the conductive structure and/or the insulating region placed in between. The transponder tag (in particular the strap) is electrically, in particular capacitively, coupled to the antenna and/or the scattering metal object and/or the electromagnetic band gap antenna.

Advantageously, the implementation according to an embodiment of the transponder tagged object may not require the use of a special antenna configuration combined with special materials. In particular, a portion of the object or the whole object may act as a scatterer or as an antenna and may allow transforming electromagnetic energy from the electromagnetic waves to the RFID integrated circuit or from the RFID integrated circuit to the antenna for transmission of a radio frequency electromagnetic wave to a reader device.

In particular, a correct placement or implementation of the transponder tag or RFID tag to the metal object by using a strap may be based on an accurate design of the metal object to be identified. In particular, a geometry, a configuration and a distribution of metal parts within a casing of the object may be adapted such that at least two metal portions of the casing of the object may act as an electromagnetic gap antenna and/or an electromagnetic band gap antenna in the radio frequency band which is used to operate the transponder tag. In particular, the metal object or the casing of the object may be designed in a way that it implements an electromagnetic gap between two parts or portions of its structure or such that it contains an electromagnetic band gap resonating structure in the desired UHF RFID frequency range in which the transponder tag is designed to operate.

The transponder tagged object may provide a low cost radio frequency identification solution for a metal object without using expensive special antennas and/or materials. In particular, a mobile phone may be an example of the object. Herein, the mobile phone's metal structure may act as a housing and as antenna ground.

In particular, according to an embodiment, an especially designed transponder tag may be avoided and the radio frequency identification of the metal object may be obtained by taking advantage of the metal structure or electro-mechanical structure of the casing of the object, wherein at a particular location the strap may be attached.

According to an embodiment the transponder tag is an RFID tag (being configured to receive and/or transmit a radio frequency electromagnetic wave and configured to process the received electromagnetic wave signal) or a contactless chip card. Thereby, the transponder tagged object may be manufactured using conventionally available transponder tags. Thereby, the costs of the transponder tagged object may be reduced.

According to an embodiment the first portion and the second portion are both galvanically isolated from the first antenna pad and the second antenna pad. Thus, no electric current can flow from the first portion to the first antenna pad and no electric current can flow from the second portion to the second antenna pad or from the second antenna pad to the second portion. In particular, the first portion is capacitively coupled or connected to the first antenna pad and the second portion is capacitively coupled or connected to the second antenna pad. Thereby, no electrical contacts are required to electrically connect the first portion to the first antenna pad and to electrically connect the second portion to the second antenna pad thus reducing the complexity and the costs of the transponder tagged object.

According to an embodiment at least a part of the first antenna pad of the transponder tag is placed in register (in particular laterally aligned) with at least a part of the first portion (such that the first antenna pad is for example placed above or below the first portion) and is spaced apart from the conductive structure (in particular the first portion of the conductive structure) in a direction perpendicular to a surface of the conductive structure (in particular, in case that the conductive structure forms at least a portion of a casing of the object, the first antenna pad may be placed external to the casing, spaced apart from a surface of the casing) and/or at least a part of the second antenna pad of the transponder tag is placed in register (in particular laterally aligned) with at least a part of the second portion and is spaced apart from the conductive structure in the direction perpendicular to the surface of the conductive structure. Thereby, a manufacturing of the transponder tagged object may be achieved by properly placing the transponder tag such that the first portion is in register with the first antenna pad (in particular in a lateral direction) and the second portion is placed in register with the second antenna pad (in particular in a lateral direction) such that the first portion at least capacitively couples to the first antenna pad and such that the second portion at least capacitively couples to the second antenna pad.

According to an embodiment at least one of the first portion and the second portion of the conductive structure has a resonance frequency in a UHF transponder frequency band, in particular between 800 MHz and 1000 MHz, in particular between 840 MHz and 960 MHz, further in particular in ISM frequencies bands between 840 MHz and 960 MHz and 2.45 GHz, in which the transponder tag is configured to operate. Thereby, a reception strength or quality and/or a transmission strength or quality may be improved.

According to an embodiment the conductive structure is at least a portion of a casing of the object. Thereby, in particular the casing of the object may serve two functions, namely as a first function to enclose and/or to support other components comprised within the object and as a second function to act as an antenna for the transponder tag. In particular, the configuration, geometry and material of the casing, possibly comprising a conductive material and a non-conductive material, may be adapted and/or shaped such that both functions are supported.

According to an embodiment the insulating region forms a gap between the first portion and the second portion. The gap may be filled with an insulating material or may be filled with air. The gap may extend in a longitudinal direction and the extent in the longitudinal direction may be two times, five times, ten times as large as a width of the gap or even larger. In particular, the geometry of the gap, in particular the width of the gap and/or the longitudinal extent of the gap, may be designed such as to support the antenna function of the first portion and the second portion as well as to support a function as a casing of the first portion and the second portion.

According to an embodiment the insulating region in the conductive structure and/or the conductive structure of the object (in particular the first portion of the conductive structure and/or the second portion of the conductive structure) forms an electromagnetic band gap resonating structure having a resonance frequency in a UHF transponder frequency band, in particular between 800 MHz and 1000 MHz, further in particular between 840 MHz and 960 MHz, further in particular in ISM frequencies bands between 840 MHz and 960 MHz and 2.45 GHz, in which the transponder tag is configured to operate. Thereby, a quality and/or strength of a transmission signal or a reception signal may be improved to improve the performance of the transponder tagged object.

According to an embodiment the transponder tag comprises a dielectric substrate (in particular comprising an isolating flexible material), in particular comprising a polymer, such as PET, having a first surface via which the transponder tag is attached to the object (the first surface may thereby face or be adjacent to a surface of the object) and having a second surface opposite to the first surface (in particular, the first surface and the second surface may be surfaces of the substrate having a largest extent, wherein a thickness of the dielectric substrate may be 10 times, 100 times smaller than a (in particular minimal) lateral extent within the first surface or the second surface); a first conductive element attached to the second surface of the substrate (wherein the second surface is not intended to be attached to the object); a second conductive element attached to the second surface of the substrate, wherein the first conductive element is spaced apart (thereby forming a distance to the second conductive elements) and is galvanically isolated from the second conductive element (such that no electric current is allowed to flow between the first conductive element and the second conductive element); a transponder integrated circuit comprising the first antenna pad and the second antenna pad and adapted for receiving from and/or supplying to the antenna pads (the first antenna pad and the second antenna pad) a UHF signal (sent from a reader device or to be transmitted from the transponder), wherein the first antenna pad is galvanically connected to the first conductive element and the second antenna pad is galvanically connected to the second conductive element. In particular, the first conductive element and the second conductive element may be adapted for an improved capacitive coupling to the first portion of the conductive structure and the second portion of the conductive structure, respectively. Thereby, it is not required to particularly design the first antenna pad and the second antenna pad for an improved coupling which would be more difficult to achieve, since the first antenna pad and the second antenna pad may be integrated into the transponder integrated circuit.

According to an embodiment the first conductive element and/or the second conductive element has a thickness (being an extent in a direction perpendicular to the first surface of the dielectric substrate and perpendicular to the second surface of the dielectric substrate, in particular a direction perpendicular to the surface of the object) between 2 μm and 50 μm. Further, the dielectric substrate may have a thickness between 20 μm and 100 μm, in particular between 30 μm and 40 μm. Further in particular, the transponder integrated circuit may have a thickness between 100 μm and 300 μm, in particular between 150 μm and 250 μm. Thereby, the transponder tag may be a relatively thin device which may be attached to the object without increasing the volume of the object in a significant degree. Thereby, the transponder tag may be adapted for tagging a large number of differently sized objects.

According to an embodiment the first conductive element is spaced apart and galvanically isolated from the second conductive element by an isolating element placed in between. In particular, the isolating element placed in between may at least partially support the transponder integrated circuit which may be placed on top of the first conductive element, the second conductive element and the isolated element placed in between. In particular, the transponder integrated circuit may be attached to the dielectric substrate via the first conductive element, the second conductive element and the isolating element placed in between, wherein the first antenna pad of the transponder integrated circuit may be electrically connected to the first conductive element by a conductive adhesive and the second antenna pad of the transponder integrated circuit may be electrically connected to the second conductive element by a conductive adhesive. Thereby, a manufacturing of the transponder tag and thus the transponder tagged object may be simplified.

According to an embodiment the transponder integrated circuit is attached to the first conductive element and the second conductive element using an adhesive, which is in particular conductive to provide electric connection between the first antenna pad and the first conductive element and between the second antenna pad and the second conductive element, respectively. Thereby, assembling the transponder tag may be simplified.

According to an embodiment the object is a mobile phone. Herein, the conductive structure may be at least a portion of a frame structure and/or a casing of the mobile phone.

According to an embodiment a method for manufacturing a transponder tagged object is provided, wherein the method comprises identifying an insulating region in a conductive structure of the object, wherein the insulating region galvanically isolates a first portion of the conductive structure from a second portion of the conductive structure, establishing a placement of the transponder tag, wherein the first portion of the conductive structure, in particular capacitively, couples to a first antenna pad of the transponder tag and the second portion of the conductive structure, in particular capacitively, couples to a second antenna pad of the transponder tag; and fixing the transponder tag at the object according to the established placement.

In particular, the first portion of the conductive structure may capacitively couple to the first antenna pad and the second portion of the conductive structure may capacitively couple to the second antenna pad, whereby a galvanic coupling between the first portion of the conductive structure and the first antenna pad is not required and whereby also a galvanic connection between the second portion of the conductive structure and the second antenna pad is not required for operating the transponder tagged object.

It should be understood that features (individual or in any combination) disclosed, described, mentioned or explained with respect to an embodiment of a transponder tagged object may also be applied, used for or employed (individually or in any combination) to an embodiment of a method for manufacturing a transponder tagged object. In the same way the reverse holds.

BRIEF DESCRIPTION OF THE DRAWINGS

The invention will be described in more detail hereinafter with reference to examples of embodiment but to which the invention is not limited. Embodiments of the present invention are now described with reference to the accompanying drawings to which the invention is not restricted.

DESCRIPTION OF EMBODIMENTS

The illustration in the drawing is schematic. In different drawings, similar or identical elements are provided with similar or identical reference signs.

Figure 1:
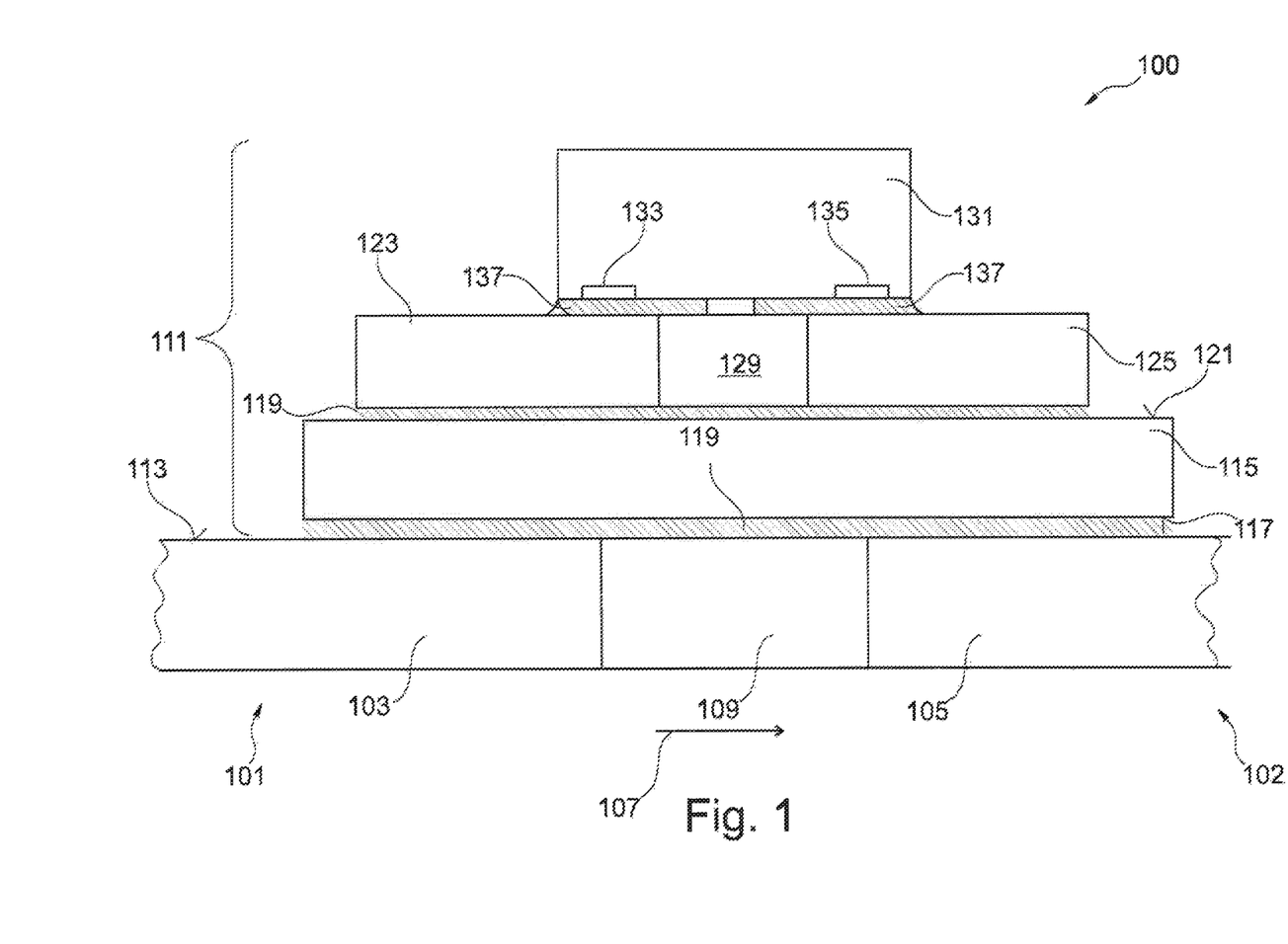
FIG. 1 schematically illustrates a cross-sectional view of a portion of a transponder tagged object according to an embodiment.

FIG. 1 schematically illustrates a cross-sectional view of a portion of a transponder tagged object 100 according to an embodiment. The object 102 comprises a metal casing 101 comprising a first portion 103 and a second portion 105 which are spaced apart in a lateral direction 107 and which are separated from each other by an insulating region 109 which in the illustrated embodiment has a shape of a gap, in particular comprising an insulating material. In particular, the first portion 103 of the casing 101 is galvanically isolated by the insulating region 109 from the second portion 105 of the casing 101.

A transponder tag 111 is attached to the surface 113 of the casing 101 of the object. The transponder tag comprises a dielectric substrate or film 115 comprising a first surface 117 which is attached to the surface 113 of the casing 101 by an adhesive 119. The substrate 115 carries on a second surface 121 a first conductive element 123, a second conductive element 125 and an isolating element 129 placed in between the first conductive element 123 and the second conductive element 125. Thereby, the first conductive element 123, the isolating element 129 and the second conductive element 125 are attached to the substrate 115 using an adhesive 119. The adhesive 119 may be non-conductive.

On top of the first conductive element 123, the isolating element 129 and the second conductive element 125 a transponder integrated circuit 131 is placed comprising a first antenna pad 133 and a second antenna pad 135, wherein the first antenna pad 133 is galvanically connected to the first conductive element 123 and wherein the second antenna pad 135 is galvanically connected to the second conductive element 125 by a conductive adhesive 137.

It should be noted that the first portion 103 of the casing 101 is galvanically isolated from the first conductive element 123 and also from the first antenna pad 133. Further, it should be noted that the second portion 105 of the casing 101 is also galvanically isolated from the second conductive element 125 and also from the second antenna pad 135 of the transponder tag integrated circuit 131. However, the first portion 103 of the casing 101 is capacitively coupled via the first conductive element 123 to the first antenna pad 133 and the second portion 105 of the casing 101 is capacitively coupled via the second conductive element 125 to the second antenna pad 135. Thereby, exchange of radio frequency electromagnetic signals between the casing 101 acting as an antenna and the transponder tag integrated circuit 131 is enabled.

Figure 2:
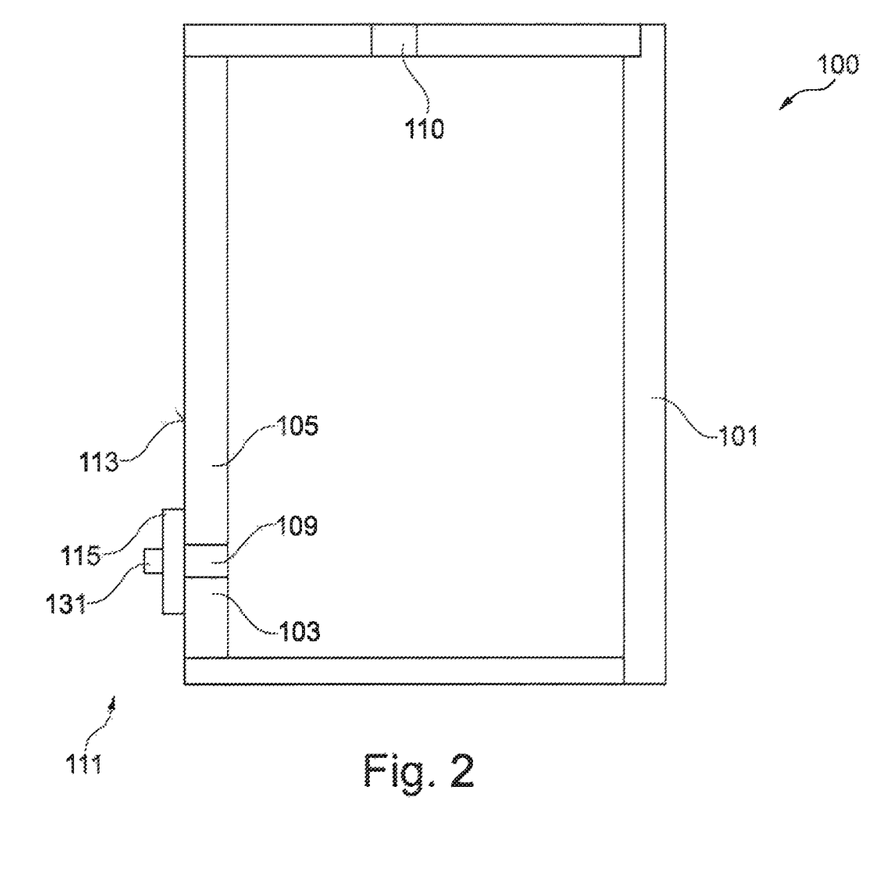
FIG. 2 schematically illustrates a cross-sectional view of a transponder tagged object according to an embodiment.

FIG. 2 illustrates the entire transponder tagged object 100 in a schematic cross-sectional view. The object is enclosed by the casing 101 which consists of two separate metallic portions 103 and 105. The portions 103 are separated from each other via a gap 109 and via another gap 110. In proximity to the gap 109 the transponder tag 111 is fixed to the surface 113 of the object 100. In particular, the surface 113 is a surface of the casing 101 of the object 100. In particular, the object 100 may be a mobile phone. In particular, the housing 101 of the mobile phone 100 is made of two separate parts 103 and 105 and an electric gap is located between these two parts. Due to the electric and/or geometrical configuration of the phone metal housing/GND/antenna, when it is placed inside the electromagnetic field radiated by an RFID interrogator or reader device a high electric field appears in the gap region 109 between the first portion 103 of the casing 101 and the second portion 105 of the casing 101. By placing the transponder tag (here embodied as a strap) exactly on top of the gap a capacitive electric coupling is obtained between the metal structure (conductive portion 103 and conductive portion 105) and the strap, this coupling allowing to transfer energy from electromagnetic waves to the integrated circuit 131 comprised in the strap 111 via the metal structures 103 and 105 and allowing to power up the integrated circuit 131 and consequently to enable RFID operations.

Figure 3:
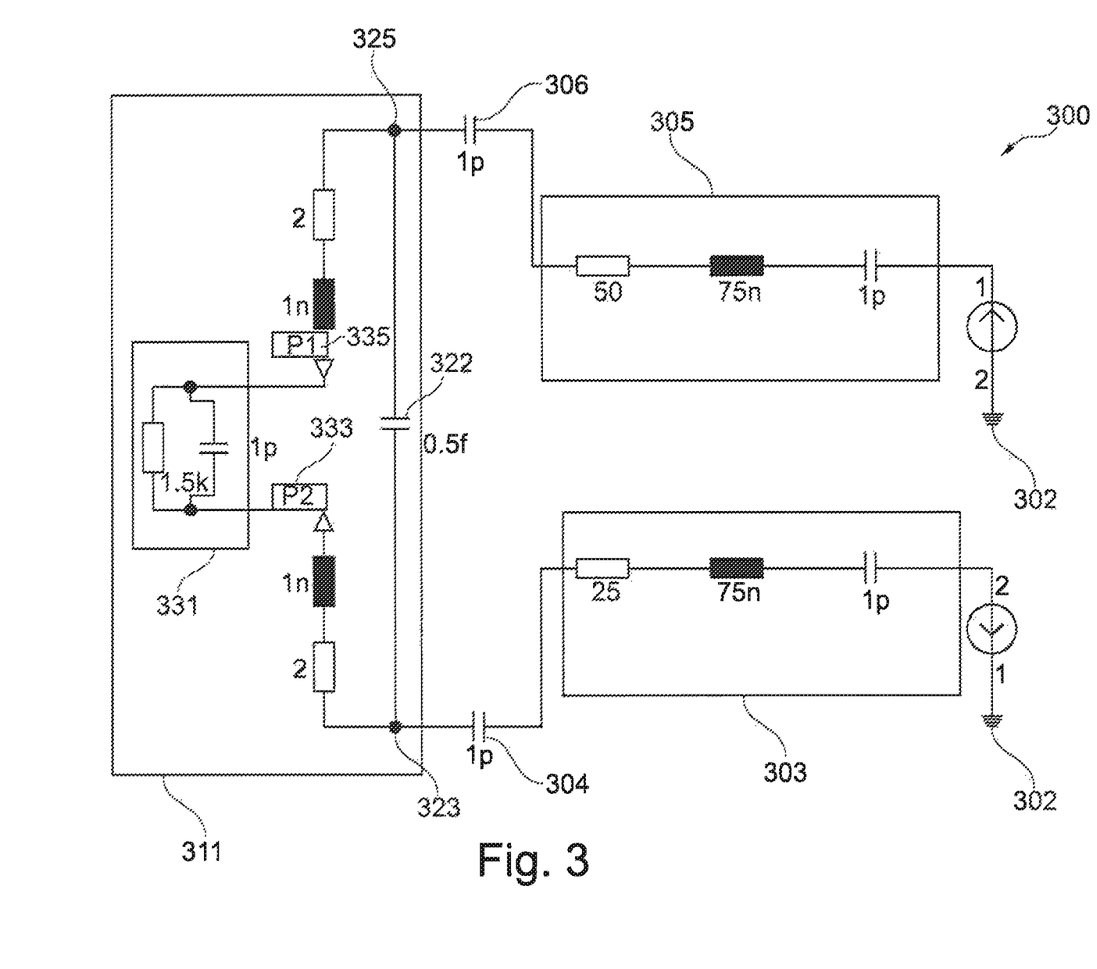
FIG. 3 schematically illustrates an equivalent circuit diagram for illustrating a coupling of a transponder tag to a first portion and a second portion of a casing of an object.

FIG. 3 schematically illustrates an equivalent circuit diagram 300 electrically explaining the configuration of the transponder tagged object 100 illustrated in FIG. 1. Electric elements corresponding to mechanical elements illustrated in FIG. 1 are denoted with the same reference sign differing only in the first digit. The first conductive portion 103 illustrated in FIG. 1 being a portion of the casing 101 of the object is represented in FIG. 3 as a box 303 comprising a capacitor, an inductor and a resistor which receive a radio frequency signal via an electromagnetic wave. In analogy the second portion 105 of the casing 101 illustrated in FIG. 1 is represented in FIG. 3 as a box 305 also comprising a capacitor, an inductor and a resistor which receive the RF signal via an electromagnetic wave.

As illustrated in FIG. 3 the first portion 103, 303 of the casing 101 of the object is capacitively coupled via a capacitor 304 to the first conductive element 123 comprised in the transponder tag 311 which is represented in FIG. 3 as a connection node 323. Also, the second conductive portion 105, 305 of the casing 101 of the object is capacitively coupled via a capacitor 306 to the second conductive element 125 of the transponder tag 111 which is in FIG. 3 illustrated as a connection node 325.

The connection node 323 is galvanically isolated from the connection node 325 (in analogy of the electric and galvanic separation of the first conductive element 123 and the second conductive element 125 illustrated in FIG. 1) but are capacitively coupled to each other via a capacitor 322. The connection node 323 is galvanically connected via a resistor and an inductance to the first antenna input pad 133 which is represented in FIG. 3 as a connection point 333. Further, the connection node 325 is galvanically connected via a resistor and an inductor to the second antenna pad 135 which is represented in FIG. 3 as a connection point 335.

The integrated circuit 131 represented by the box 331 in FIG. 3 comprises a resonator circuit which receives or generates a radio frequency signal. At least one of the first portion 303 or the second portion 305 of the conductive structure or casing should be tuned at the resonance frequency of the resonator circuit of the transponder integrated circuit, to be able to achieve maximum reading or transmission performance. If maximum reading performances are not required the antennas may be tuned at different frequencies.

Figure 4:
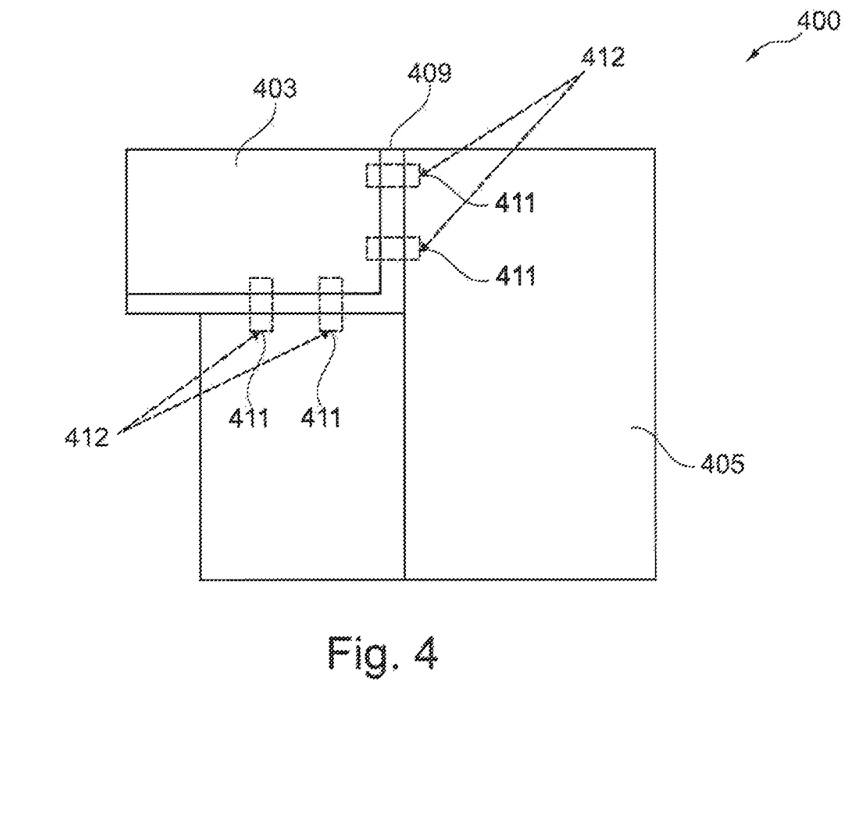
FIG. 4 schematically illustrates another embodiment of a method for manufacturing a transponder tagged object.

FIG. 4 schematically illustrates another possibility of taking advantage of an electric gap between two metal parts of a casing of an object. Herein a first scattering object 403 is a portion of a metallic enclosure of the object and the scattering object 405 is another portion of the metallic enclosure of the object. The first scattering object 403 is separated from the second scattering object 405 by a gap 409. The first scattering object 403 is not electrically connected to the second scattering object 405. However, these two scattering objects may be partially (electrically or galvanically) connected by means of a few screws or other system. The transponder tag 411 may be placed in any position along the gap 409 between the two different objects, such that the transponder tag 401 has one of the positions labelled with reference sign 412.

Figure 5:
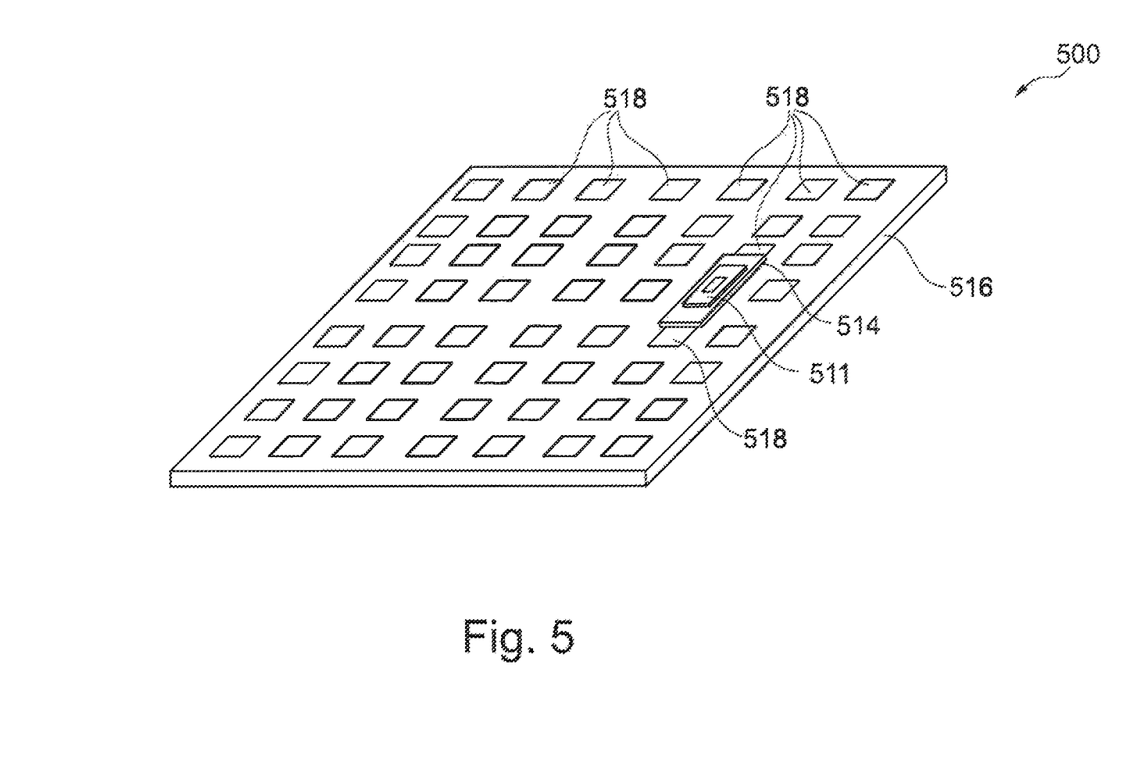
FIG. 5 schematically illustrates another embodiment of a method for placing a transponder tag to an object.

FIG. 5 illustrates another possibility of coupling between the transponder tag and a metal object on top or in close proximity to an electromagnetic band gap resonating structure. In FIG. 5 the strap 511 or transponder tag 511 is coupled electrically directly or by means of extra dielectric layer 514 to any electromagnetic band gap structure 516 that resonates in the UHF RFID frequency band in which the transponder tag 511 is configured to operate. As is illustrated in FIG. 5 the strap 511 is placed onto an extra dielectric layer 514 which is attached to the surface of the object formed by a substrate (in particular isolating) 516 onto which conductive elements 518 are placed in a regular two-dimensional pattern. The arrangement of conductive elements 518 and the size or geometry of the conductive elements 518 may be adapted according to the application.

Figure 6A:
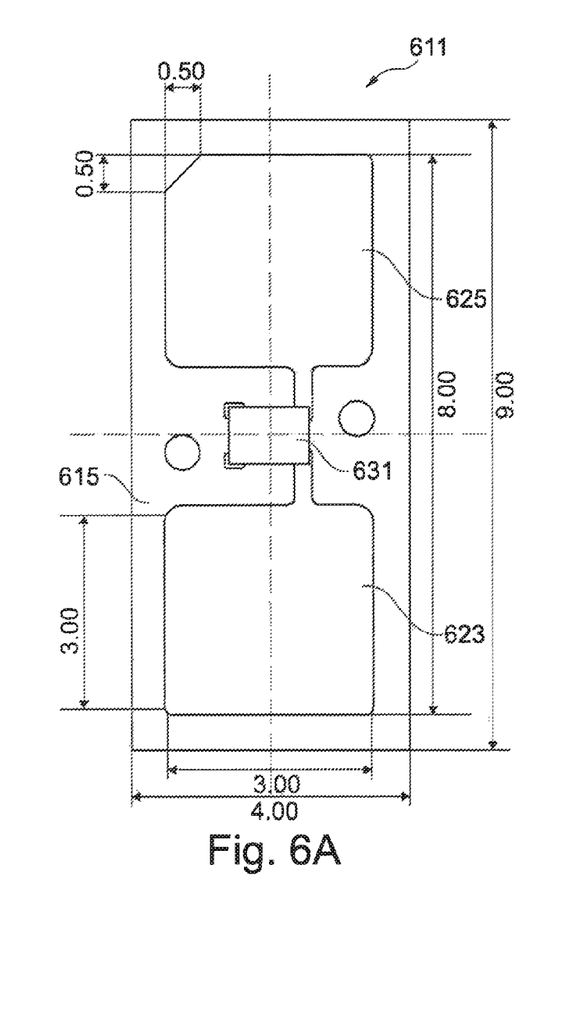
FIGS. 6A and 6B schematically illustrate a transponder tag embodied as a strap that may be used for a transponder tagged object according to an embodiment.
Figure 6B:
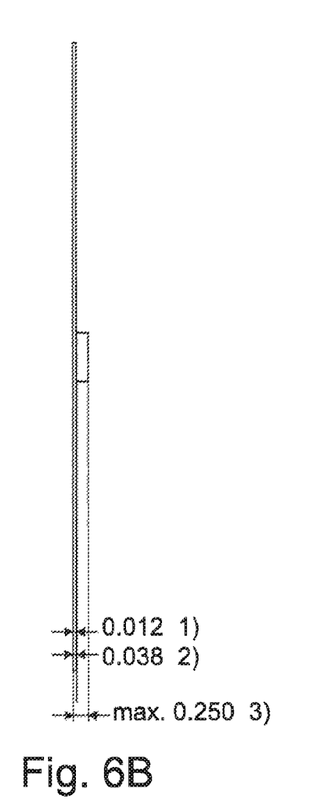

FIGS. 6A and 6B schematically illustrate a strap or transponder tag 611 which may be used in a transponder tagged object according to an embodiment. The strap 611 comprises the dielectric substrate 615 on which the first conductive element 623 and the second conductive element 625 are attached. On top of these conductive elements 623 and 625 the transponder integrated circuit 631 is placed, wherein the first antenna pad of the integrated circuit 631 is galvanically connected to the first conductive element 623 and wherein the second antenna pad of the integrated circuit 631 is galvanically connected to the second conductive element 625. The dimensions of the strap 611 are given in mm in the drawing, wherein FIG. 6A illustrates a plan view and FIG. 6B illustrates a cross-sectional view. As can be seen from FIGS. 6A and 6B the overall thickness of the strap 611 is below 0.25 mm and the lateral extension perpendicular to the thickness direction is 9 mm×4 mm. Thereby, differently sized objects may be tagged with the strap 611.

REFERENCE SIGNS 100,300,400,500 Transponder tagged object
103,303,403 First portion of conductive structure
105,305,405 Second portion of conductive structure
115,615 Dielectric substrate
123,323,623 First conductive element
125,325,625 Second conductive element
131,331,631 Transponder integrated circuit
133,333 First antenna pad
135,335 Second antenna pad
109,409 Insulating region or gap
304,306,322 Capacitors
302 Ground
516 Substrate and conductive layer electromagnetic band gap
518 Metal part
514 Extra dielectric layer

The invention claimed is:

1. Transponder tagged object, the object comprising:
a conductive structure being at least a portion of a metal housing of the object;
an insulating region galvanically isolating a first portion of the conductive structure from a second portion of the conductive structure wherein the insulating region forms a gap between the first portion and the second portion; and
a transponder tag comprising a first antenna pad and a second antenna pad,
wherein the transponder tag is fixed to the object such that the first portion of the conductive structure capacitively couples to the first antenna pad and such that the second portion of the conductive structure capacitively couples to the second antenna pad; and
wherein
at least a part of the first antenna pad of the transponder tag is placed in register with at least a part of the first portion and is spaced apart from the conductive structure in a direction perpendicular to a surface of the conductive structure and/or
at least a part of the second antenna pad of the transponder tag is placed in register with at least a part of the second portion and is spaced apart from the conductive structure in the direction perpendicular to the surface of the conductive structure.

2. Transponder tagged object according to claim 1, wherein the transponder tag is a RFID tag or a contactless chip card.

3. Transponder tagged object according to claim 1, wherein the first portion and the second portion are both galvanically isolated from the first antenna pad and the second antenna pad.

4. Transponder tagged object, the object comprising:
a conductive structure being at least a portion of a metal housing of the object;
an insulating region galvanically isolating a first portion of the conductive structure from a second portion of the conductive structure wherein the insulating region forms a gap between the first portion and the second portion; and
a transponder tag comprising a first antenna pad and a second antenna pad,
wherein the transponder tag is fixed to the object such that the first portion of the conductive structure capacitively couples to the first antenna pad and such that the second portion of the conductive structure capacitively couples to the second antenna pad; and
wherein the transponder tag comprises:
a dielectric substrate, in particular comprising a polymer, having a first surface via which the transponder tag is attached to the object and having a second surface opposite to the first surface;
a first conductive element attached to the second surface of the substrate;
a second conductive element attached to the second surface of the substrate, wherein the first conductive element is spaced apart and galvanically isolated from the second conductive element;
a transponder integrated circuit comprising the first antenna pad and the second antenna pad and adapted for receiving from and/or supplying to the antenna pads a UHF signal,
wherein the first antenna pad is galvanically connected to the first conductive element and the second antenna pad is galvanically connected to the second conductive element.

5. Transponder tagged object according to claim 4, wherein the first conductive element and/or the second conductive element has a thickness between 2 μm and 50 μm.

6. Transponder tagged object according to claim 4, wherein the first conductive element is spaced apart and galvanically isolated from the second conductive element by an isolating element placed in between.

7. Transponder tagged object according to claim 4, wherein the transponder integrated circuit is attached to the first conductive element and the second conductive element using an adhesive.

8. Transponder tagged object according to claim 4, wherein the object is a mobile phone.

9. Method for manufacturing a transponder tagged object, the method comprising:
identifying an insulating region in a conductive structure of the object, the conductive structure being at least a portion of a metal housing of the object, wherein the insulating region galvanically isolates a first portion of the conductive structure from a second portion of the conductive structure; wherein the insulating region forms a gap between the first portion and the second portion;
establishing a placement of the transponder tag, wherein the first portion of the conductive structure capacitively couples to a first antenna pad of the transponder tag and the second portion of the conductive structure in capacitively couples to a second antenna pad of the transponder tag; and
wherein
at least a part of the first antenna pad of the transponder tag is placed in register with east a part of the first portion and is spaced apart from the conductive structure in a direction perpendicular to a surface of the conductive structure and/or
at least a part of the second antenna pad of the transponder tag is placed in register with at least a part of the second portion and is spaced apart from the conductive structure in the direction perpendicular to the surface of the conductive structure; and
fixing the transponder tag to the object according to the established placement.

* * * * *